Dec. 16, 1952  J. J. PIEKARSKI ET AL  2,622,215
IMPULSE COUPLING

Filed June 13, 1951  2 SHEETS—SHEET 1

INVENTORS,
Joseph J. Piekarski,
John L. Baillargeon,
BY Chapin & Neal
ATTORNEYS

INVENTORS,
Joseph J. Piekarski,
John L. Baillargeon,
BY Chapin + Neal
ATTORNEYS

Patented Dec. 16, 1952

2,622,215

UNITED STATES PATENT OFFICE 2,622,215

IMPULSE COUPLING

Joseph J. Piekarski, Westfield, and John L. Baillargeon, Springfield, Mass., assignors to Wico Electric Company, West Springfield, Mass., a corporation of Massachusetts Application June 13, 1951, Serial No. 231,382

5 Claims. (Cl. 310—84)

This invention relates to improvements in impulse couplings, such as are used for driving a magneto from an internal combustion engine at cranking speeds.

Such couplings include a spring, through which one member of the coupling is driven from the other, and means operable at low speed for arresting the driven member, while the driving-member continues to move and increase the stress of the spring, and then releasing the driven member, whereby the previously stressed spring drives the driven member ahead with a quick impulse to cause the magneto to produce an adequate ignition spark. The arresting means are rendered inoperative, at speeds above cranking speeds, by weights which are thrown outwardly by centrifugal force and the driving and driven members are then supposed to move synchronously without any relative angular movement between them. However, the magnetic attraction between the rotor and stator of the magneto varies at various positions in each revolution of the rotor and this uneven load tends to cause relative angular movement between the driving and driven elements. If the impulse spring of the coupling is given enough initial stress to hold the driving and driven members against relative movement, then the spring, when stressed, is likely to impel the rotor of the armature with such force as to cause damage to the driving means, which wind up the spring. In particular, when the magneto is driven from the distributor shaft of the engine, the stress of the impulse spring must be kept relatively low in order to avoid unnecessary shock and rapid wear on parts of the driving means, which were originally designed only to drive a breaker lever and the brush of a distributor. With a spring of this character, there is more of a tendency for the driven member to flutter, especially at certain critical speeds, moving back and forth relatively to the driving member and causing undesired variations in timing of the ignition sparks.

This invention has for its object the provision of an improved and simple, inexpensive, yet very effective means for resisting relative angular movement of the driving and driven members of the coupling during non-impulse drive.

The invention will be disclosed with reference to one illustrative example of it in the accompanying drawings, in which, Fig. 1 is a sectional elevational view of an impulse coupling embodying the invention;

Figs. 2 and 3 are cross sectional views taken on the lines 2—2 and 3—3, respectively, of Fig. 1 and showing the coupling parts in the relative positions which they occupy at the start of the spring-stressing operation;

Fig. 7 is a fragmentary cross sectional view taken on the line 7—7 of Fig. 6.

Figure 1:
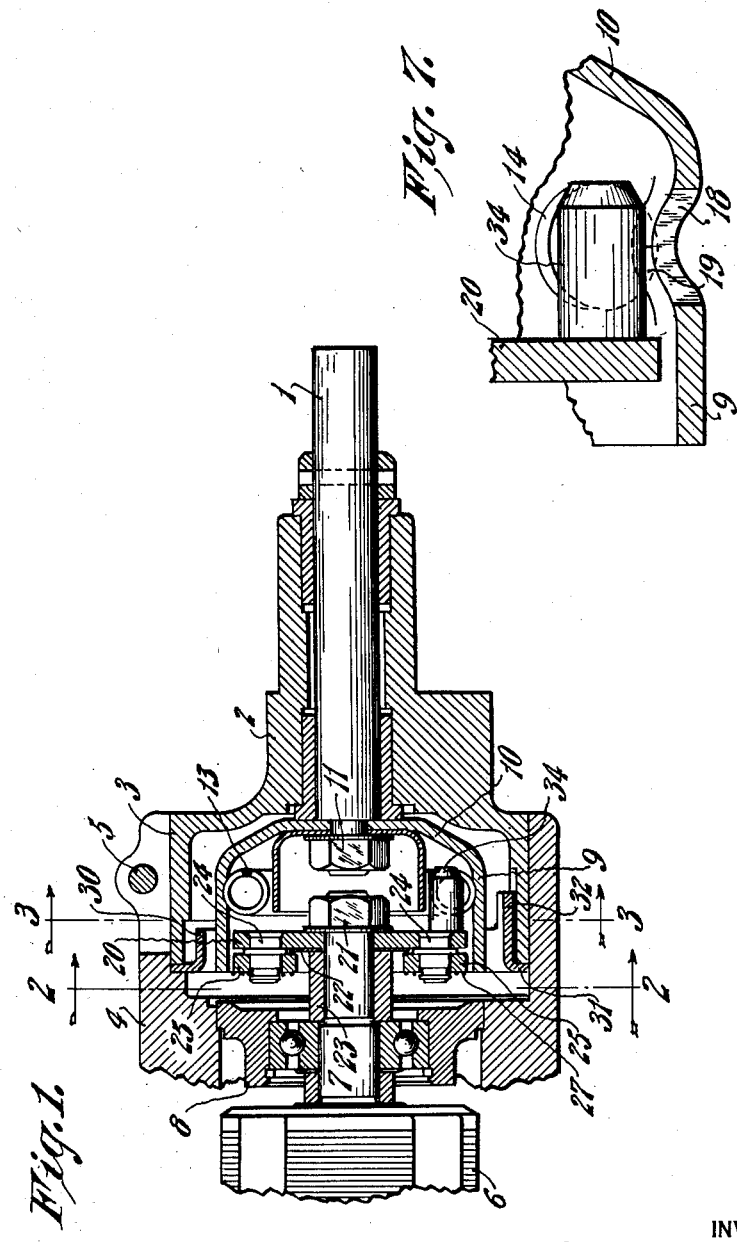

Referring to these drawings and first to Fig. 1 thereof, the driving shaft is shown at 1 as rotatably mounted in bearings in the hub 2 of a cup-shaped member 3. The latter telescopes into a cylindrical recess in one end of the housing 4 of the magneto and is suitably fixed therein, as by means of the screw 5, which acts to draw the split sections of the surrounding part of the housing together in order to clamp the member 3 in place. The rotor of the magneto is shown in part at 6 and its shaft 7, which is the driven shaft of the coupling, is mounted at one end in a bearing in a member 8, suitably fixed in the housing 4.

Figure 6:
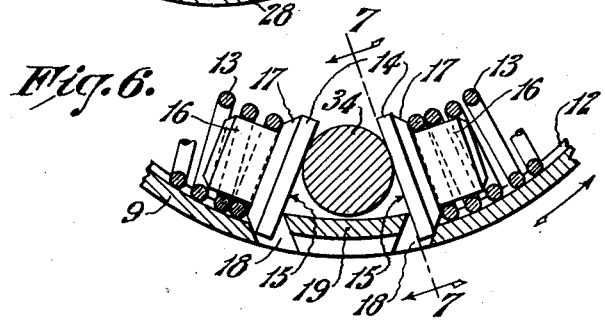
Fig. 6 is an enlarged fragmentary cross sectional view showing the novel means for releasably holding the driving and driven members of the coupling against relative angular movement during non-impulse drive.

The driving member of the coupling consists of a cup-shaped member having an annular wall 9 and an integrally connected end wall 10, suitably fixed to driving shaft 1, as by a nut 11, which is threaded on the inner end of shaft 1 and acts to clamp the end wall 10 against a shoulder on the shaft. The annular wall 9 has a groove 12 in its inner face to receive a compressible coil spring 13 in the form of an annulus (Fig. 3), which is disposed within the cup-shaped driving member, and the annular wall 9 thereof, and bears against the inner face of said wall, and particularly the grooved portion thereof. Fixed one in each end of spring 13 are buttons 14, which have confronting outer faces 15 (Fig. 6). Each button is fixed to the spring by a cylindrical plug 16, which is inserted in the opening of the last few coils of the spring and tightly fits such coils. The inner face of each button forms a seat for the spring and extending outwardly beyond such seat is a chamfered portion 17. The annular wall 9 has two angularly-spaced transverse slots 18 therein, each adapted to receive a portion of a button 14 that projects outwardly beyond the outer periphery of the spring 13. A portion of the wall 9, which lies between the two slots is pressed inwardly (see also Fig. 7), forming a projection 19 on the driving member engaging the outer faces 15 of both buttons 14. The walls of each slot 18 (Fig. 6) are inclined at an acute angle to a radius of the driving member that passes through the slot and, preferably as shown, the inclination of that wall of slot 18, which engages the chamfered portion 17, is such as to match the chamfer so that the two faces engage flatly. While this is the preferred arrangement, it is possible for only one of the two engaged walls to be inclined because all that is necessary is to have that part of a button, which projects into a slot, capable of being cammed out of the slot by movement of the driving member after the driven member has been arrested.

The driven member consists of a plate 20 (Fig. 1), suitably fixed to an end of shaft 7, as by means of a nut 21, threaded on the end of shaft 7 and clamping the plate against a thin facing disk 22, the latter against a spacer sleeve 23 and the sleeve against a shoulder on the shaft. The shaft has a non-circular cross section (Fig. 2) engaged with a similarly shaped opening in plate 20. This plate 20 lies within the mouth of the cup-shaped driving member and substantially closes the same. It has fixed to its outer face at two diametrically opposite points fulcrum pins 24 (Fig. 2) for latch levers 25, which have weights 26 integral therewith. Each lever 25 is moved outwardly by a spiral spring 27, which is fixed at one end to a fulcrum pin 24 of its lever and at the other end is fixed to the lever itself. These levers 25 project through slots 28 in the annular wall 9 of the driving member. The levers 25 are moved inwardly into the cup-shaped driving member by means of the weights 26, which move outwardly by centrifugal force at speeds above a predetermined low speed, such as cranking speed. The weights move over the surface of the facing disk 22, which is hardened to take the wear.

Figure 2:
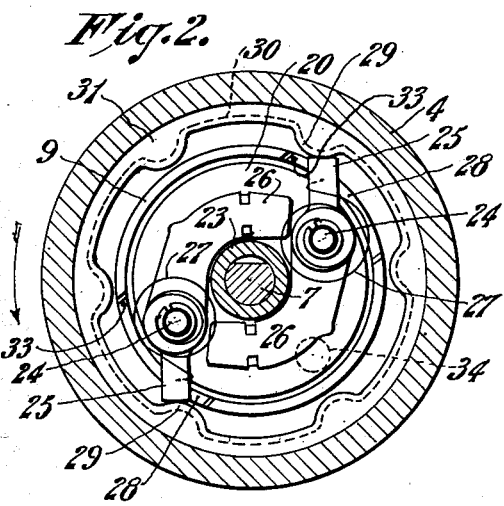

The described fingers 25 are adapted to engage any one of a plurality of angularly-spaced stops 29, formed in an outturned flange 30 of an annular disk 31, which is clamped between the inner end of member 3 and a shoulder in the described recess in the magneto housing. A projection 32 (Figs. 1 and 3) from flange 30 is received in a groove in member 3 and acts as a key to hold the stop disk 31 against rotation. The number of stops on the stationary disk 30 will vary to suit the needs of the particular engine with which the impulse coupling is used. Six are shown herein, being what is needed for a six cylinder engine, when shaft 1 is driven from the engine at crankshaft speed. When the driving member is moved slowly, as on cranking, the latch levers 25 will be projected outwardly by their springs 27 and will soon engage one with each of a pair of stops 29, as shown in Fig. 2, and thus hold the driven member against rotation. On continued movement of the driving member to stress the spring 13, one wall 33 of each slot 28 will engage a lever 25, as shown in Fig. 4, and force the latter off the stop 29 which it had theretofore engaged. This will release the driven member for movement by the stressed spring 13. This spring acts to move the driven member by means of a projection thereon in the form of a cylindrical pin 34, fixed to plate 20 and projecting into the cup-shaped driving member and suitably located between and in engagement with the two confronting faces 15 of the buttons on the ends of the impulse spring 13. The expanding spring drives the driven member rapidly ahead until it overtakes the driving member and the driving and driven projections 19 and 34 come into their normal positions shown in Fig. 3. The member 34, as it is driven forwardly by spring 13, will eventually engage the other button 14 and the latter and spring 13 act to cushion the blow of the spring-impelled projection 34.

Figure 3:
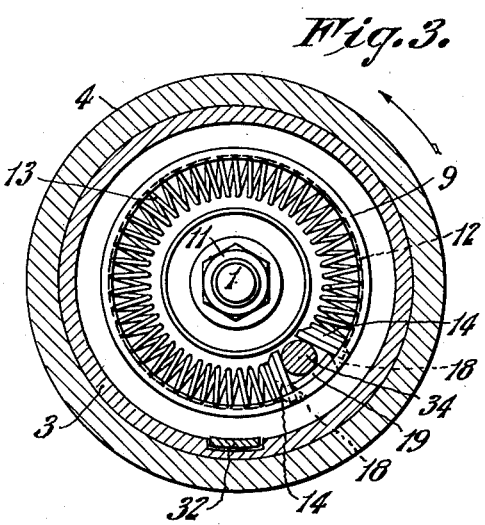
Figure 4:
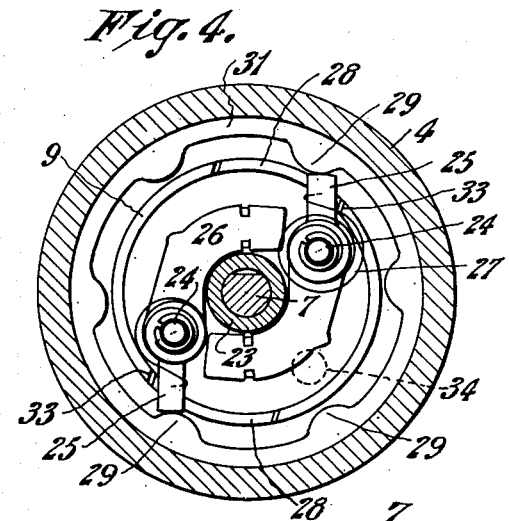
Figs. 4 and 5 are cross sectional views taken similarly to Figs. 2 and 3, respectively, and showing the coupling parts in the relative positions which they occupy at the end of the spring-stressing operation and just prior to the release of the driven member for its spring impulse movement.
Figure 5:
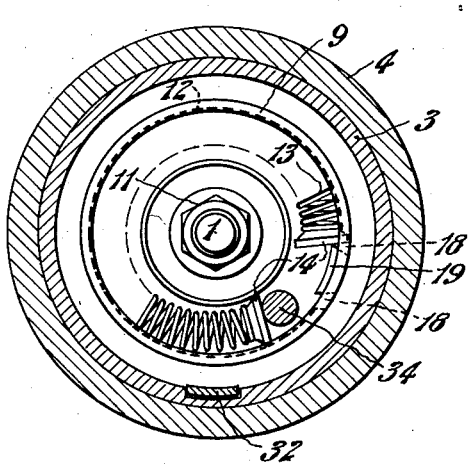

By reference to Figs. 3 and 6, it will be clear that the engagement of the two buttons 14 in the slots 18 tends to hold the driving and driven members against relative rotation. The driving projection 19 and the driven projection 34 are closely held between the confronting faces 15 of the two buttons 14 and these have parts which extend outwardly beyond the outer periphery of the coiled spring 13 and engage one in each of the slots 18 in the annular wall 9 of the driving member. Of course, the spring 13 is under some initial tension and would itself exert some force tending to prevent movement of projection 34 relatively to projection 19 but the force of spring 13 cannot be made great enough for the purpose without causing other difficulties. Hence, some additional means must be provided to keep the driven projection 34 from moving relatively to the driving projection during normal operation, when the impulse drive of the magneto rotor is not used. If the projection 34 flutters back and forth relatively to the driving projection, undesirable variations in timing of the ignition sparks will occur. The buttons 14, when engaged in the slots 18, provide the necessary resistance, in addition to other factors, such as the initial stress of spring 13 and the friction between it and wall 9, to prevent relative movement of the driving and driven members, except when impulse drive is needed. Then, when the driven projection 34 and one button 14 is held stationary, as described, and the driving projection 19 and the other button continue their counter-clockwise movement, the inclined wall of slot 18 will cam the first-named button out of its slot 18, as shown in Fig. 5, and enable the impulse operation. Except during such operation, both buttons are engaged in their slots 18 to frictionally hold the driving and driven members against the relative rotation, which might otherwise occur due to the uneven load caused by the variations in magnetic attraction which occur between the rotor and stator during various parts of each revolution of the rotor.

The invention has been described in its preferred form, in which both buttons are engaged in slots in the driving member and both driving and driven projections are tightly held between the confronting faces of the two buttons. The arrangement described can be used for clockwise or counter-clockwise drive. The only change necessary to reverse the drive, is to reverse the latch levers 25 on their fulcrum pins 24 so that they will engage the stops 29 on clockwise rotation rather than on counter-clockwise rotation, as herein shown. The arrangement effectively holds the driven projection against movement in either direction relatively to the driving member. It is, however, possible for some of the advantages of the invention to be obtained, if only one of the buttons is engaged in a slot, and it is intended to cover such an arrangement.

The invention provides a very simple, inexpensive and yet very effective means for maintaining the driving and driven members of an impulse coupling against relative rotation during non-impulse drive.

What is claimed is:

1. In an impulse coupling, having coaxial driving and driven members, the driving member having an annular wall, and a compressible coiled spring disposed in the form of an annulus within and engaging the inner surface of said wall and having its ends closely spaced apart; a pair of buttons fixed one to each end of said spring, said buttons having outer and inner faces and the outer faces being in confronting relation, a projection on the driving member engaging the outer face of one button, a projection on the driven member engaging the outer face of the other button, said annular wall having a transverse slot therein, the last-named button having a portion projecting outwardly beyond the outer periphery of said spring into said slot, the inner face of said projecting portion engaging one transverse face of said slot and at least one of said two engaged faces being at an acute angle to a radius of said wall passing through said engaged faces.

2. In an impulse coupling, having coaxial driving and driven members, said driving member including an annular wall, and a compressible coiled spring disposed in the form of an annulus within and engaging the inner surface of said wall and having its ends closely spaced apart; a pair of buttons fixed one to each end of said spring and having confronting faces, a projection on the driving member for engaging one of said faces, a projection on the driven member for engaging the other of said faces, the button having the last-named face also having an opposite face forming a seat engaged by one end of the spring and outwardly beyond such seat a chamfered portion, said annular wall having a transverse slot therein receiving a portion of the last-named button, such slot having one wall which is inclined to match the inclination of said chamfered portion and which is engaged with such chamfered portion and tends to hold the driving and driven members against relative rotation, the inclination of said slot wall being at an acute angle to a radius of said annular wall that passes through the engaged slot wall and chamfered portion.

3. In an impulse coupling, having coaxial driving and driven members, said driving member including an annular wall, and a compressible coiled spring disposed in the form of an annulus within and engaging the inner surface of said wall and having its ends closely spaced apart; a pair of buttons fixed one to each end of said spring and having confronting faces, said wall having two angularly-spaced transverse slots into which portions of said buttons extend one portion in each slot, a projection on the driving member engaging both said faces at a location outwardly beyond the axes of the buttons, and a projection on the driven member engaging both said faces inwardly of the first projection, said slots having their non-adjacent walls disposed in outwardly converging relation, each said button having the face opposite its first-named face engaged as a seat by one end of said spring and outwardly beyond such seat having a chamfered portion, said chamfered portions being engaged one with each of the converging walls of said slots.

4. In an impulse coupling, having coaxial driving and driven members, said driving member consisting of a cup-shaped metal stamping having a relatively thin annular wall, and a compressible coiled spring disposed in the form of an annulus within and engaging the inner surface of said wall and having its ends closely spaced apart; a pair of buttons fixed one to each end of said spring and having confronting faces, said wall having two angularly-spaced punched-out portions forming two transverse slots into which portions of said buttons extend one portion in each slot, the two transverse walls of one slot being disposed in outwardly converging relation with respect to the two transverse walls of the other slot, the portion of said wall between the two slots being struck inwardly forming a projection engaging both said faces at an outward radial location and a projection on the driven member engaging both said faces radially inward of the first projection.

5. In an impulse coupling, having a driving member including an annular wall, a coaxial driven member, a compressible coiled spring disposed in the form of an annulus within and adjacent the inner surface of the annular wall, a pair of buttons fixed one to each end of said spring and having outer faces disposed in confronting relation, a driving projection on the driving member engaging the outer face of one said button, a driven projection on the driven member engaging the outer face of the other button, whereby said spring may be compressed between the buttons on relative movement of said members in one direction, said annular wall being cut away outwardly beyond said surface to receive a projecting part of the second-named button and form a transversely-disposed cam face for engaging a cam face on the inner part of the second-named button, at least one of said engaging faces being at an acute angle to a radius of said wall that passes through the engaging faces, said cam faces being disengaged during the initial part of the relative movement of said members in said direction and providing during such disengagement resistance in addition to that of said spring.

JOSEPH J. PIEKARSKI.
JOHN L. BAILLARGEON.

REFERENCES CITED

The following references are of record in the file of this patent:

UNITED STATES PATENTS

| Number | Name | Date |
| --- | --- | --- |
| 1,520,207 | Pearson | Dec. 23, 1924 |
| 1,616,594 | Milton | Feb. 8, 1927 |
| 2,272,305 | Major | Feb. 10, 1942 |